(12) United States Patent
Neebe et al.

(10) Patent No.: US 7,726,460 B2
(45) Date of Patent: Jun. 1, 2010

(54) TRAY TRANSFER SYSTEM

(75) Inventors: Mark Thomas Neebe, Catonsville, MD (US); Thomas Anthony Hillerich, Columbia, MD (US); Randall Keith Neilson, Crownsville, MD (US); Robert Lee Schlender, Baltimore, MD (US); Matthew Gene Good, Marriotsville, MD (US); Jacob L. Timm, Ellicott City, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 471 days.

(21) Appl. No.: 11/709,830

(22) Filed: Feb. 23, 2007

(65) Prior Publication Data

US 2007/0207027 A1 Sep. 6, 2007

Related U.S. Application Data

(60) Provisional application No. 60/776,201, filed on Feb. 24, 2006.

(51) Int. Cl.
*B65G 37/00* (2006.01)

(52) U.S. Cl. .............. 198/346.1; 198/346.2; 414/795.9; 414/796.5

(58) Field of Classification Search .............. 198/346.1, 198/346.2, 465.1, 468.6; 414/795.9, 796.5, 414/796.9, 797, 798.7
See application file for complete search history.

(56) References Cited

U.S. PATENT DOCUMENTS

| 5,007,785 | A | * | 4/1991 | van der Schoot | ......... | 414/796.6 |
| 5,882,174 | A | * | 3/1999 | Woerner et al. | .......... | 414/788.7 |
| 5,913,655 | A | * | 6/1999 | Maday | .................... | 414/797.2 |
| 6,554,561 | B2 | * | 4/2003 | Jager | ...................... | 414/788.4 |
| 6,648,587 | B1 | * | 11/2003 | McMunigal et al. | ...... | 414/796.5 |
| 7,381,026 | B1 | * | 6/2008 | Power et al. | ............. | 414/795.6 |

\* cited by examiner

*Primary Examiner*—James R Bidwell
(74) *Attorney, Agent, or Firm*—Rothwell, Figg, Ernst & Manbeck, P.C.

(57) ABSTRACT

The present invention relates to a tray transfer system (TTS). This system is designed to automatically transfer trays of mail between dollies and conveyor belts. The TTS is an efficient method for shipping, moving, storing, loading, and unloading mail trays. It allows mail-processing centers to physically and temporally separate the process of sorting mail and the process of moving mail into automation compatible trays (ACT).

15 Claims, 15 Drawing Sheets

US 7,726,460 B2

TRAY TRANSFER SYSTEM

RELATED APPLICATIONS

This application claims priority to U.S. Provisional Patent Application Ser. No. 60/776,201 filed on Feb. 24, 2006, the disclosure of which is incorporated herein in its entirety.

BACKGROUND OF THE INVENTION

1. Field of the Invention

The present invention relates generally to, among other things, systems for handling mail (including, e.g., flats, envelopes, letters, postcards and/or other mail) and/or other objects, and certain preferred embodiments relate, more particularly, to a tray transfer system for automatically transferring trays of mail between dollies and conveyor belts.

2. Background Discussion

Currently, a variety of systems are used for the handling of objects, such as, e.g., thin objects like mail flats and/or other mail. For example, the United States Postal Service (USPS) uses various systems to facilitate and enhance the handling of mail flats. An example of one system is an automated flats sorting machine (AFSM), such as the AFSM100™ flats sorting machine built by Northrop Grumman Corporation and Rapistan Systems and used by the USPS. The AFSM100™ flats sorting machine is a mail sorting system that can process, e.g., large pieces of flat mail, such as for example magazines, in large volumes.

The USPS AFSM100™ flats sorting machine has three high-speed feeders (6000 pieces per hour). This high-speed automation has increased the demand of mail on system feeders. Operational experience has shown that this demand is challenging for operators to meet. Operators are required to place approximately 10" of mail onto a feeder per minute. Mail must be placed in proper orientation (binding down with the mailing label facing to the right) and 'groomed' to ensure proper system operation. In order to reduce the requirements on feeder operators, USPS pre-processes mail fed into this machinery. In the pre-processing step mail is converted from its current container to automation compatible trays (ACTs). This step requires additional floor space at the AFSM100™ flats sorting machine to perform the conversion. Sufficient floor space near the AFSM100™ flats sorting machine is often unavailable in many processing centers. This unavailability of sufficient floor space necessitates physically separating the pre-processing of mail and the sorting of mail. A method of transporting ACTs between the pre-processing location and the AFSM100™ flats sorting machine is needed.

Mail pre-processing times could either be faster or slower than the processing time of the AFSM100™ flats sorting machine. This depends in part on the type of mail that is pre-processed and the number of operators available to pre-process mail. The difference in the processing rates may cause periodic lag times where the AFSM100™ flats sorting machine has no mail to sort or times where the AFSM100™ flats sorting machine cannot sort the mail fast enough. Due to the varying processing rates it is therefore desirable to 'buffer' or store ACTs with mail. If the storage process is cheap and efficient then it is possible for the AFSM100™ flats sorting machine and mail pre-processing to operate at separate times.

There are a significant number of USPS mail processing centers in the country (~200). The amount of storage required, as well as the amount of floor space available varies. Therefore, it is desirable to easily vary the amount of storage.

Therefore, a need exists for a system that can overcome, among other things, the above and/or other problems with the existing system.

SUMMARY OF THE INVENTION

Various embodiments of the present invention can significantly improve upon existing systems and methods. In some preferred embodiments of the present invention, one or more of the above and/or other problems with existing systems can be overcome.

According to one embodiment, a gantry-based system for automatically transferring one or more trays of mail between a dolly and a conveyor is provided. The system includes one or more automation compatible trays configured to hold mail, a conveyor configured to transport the one or more automation compatible trays, a dolly having an upper surface upon which the one or more automation compatible trays can be loaded and unloaded, a dolly docking bay configured to receive the dolly in a loading/unloading position relative to the conveyor, and an overhead manipulator or gantry having an end effector movable in two-axes to engage and transfer one or more of the automation compatible trays between the dolly in the loading/unloading position and the conveyor. In a preferred embodiment, an upper surface of the dolly includes an impression shaped like one or more of the automation compatible trays and one or more registration probes positioned to extend into one or more holes formed in a bottom surface of the automation compatible trays. The end effector preferably extends at least partially around one or more of the automation compatible trays and includes probes that can be extended into holes formed in one or more side surfaces of the trays to hold the trays within the end effector. In a preferred embodiment, the end effector is a rectangular shaped end effector having one or more guides for ensuring proper alignment of the one or more automation compatible trays in the end effector. The dolly docking bay preferably includes a back member that acts as a stop and one or more side members that guide the dolly into the loading/unloading position within the dolly docking bay. One or more proximity sensors are preferably mounted on at least one of the stop and the sides to detect when the dolly is in the loading/unloading position within the dolly docking bay, and the dolly docking bay can further include a locking mechanism that inhibits movement of the dolly when the proximity sensor detects that the dolly is in the loading/unloading position within the dolly docking bay. Examples of suitable locking mechanisms include probes configured to extend into one or more holes in the lower surface of the dolly and/or a pusher that engages the dolly in the loading/unloading position. The system optionally includes a cap configured for placement between automation compatible trays on the first dolly and a bottom of a second dolly.

In operation of the gantry-based TTS, the overhead manipulator picks and places ACTs using a rectangular shaped end effector which surrounds multiple ACTs at the same time to provide the required throughput. The overhead manipulator moves the ACTs between a dolly and conveyor (or vice versa) using a 2-axis gantry that enables vertical and horizontal actuation.

According to a second embodiment, a conveyor-based system for automatically transferring one or more trays of mail between a dolly and a conveyor is provided. The conveyor-based system includes one or more automation compatible trays configured to hold mail, a conveyor configured to transport the one or more automation compatible trays, a dolly having a surface upon which the one or more automation compatible trays can be loaded and unloaded, a dolly docking bay configured to receive the dolly in a loading/unloading position relative to the conveyor, and at least one of a stacker for stacking automation compatible trays for loading onto the dolly from the conveyor and a destacker for unstacking automation compatible trays onto the conveyor after unloading from the dolly. In a preferred embodiment, one or more openings are formed through the surface of the dolly and the dolly docking bay further includes one or more conveyors extendible through the openings to unload one or more automation compatible trays from the dolly. A right angle transfer can optionally be positioned between the dolly docking bay and at least one of the stacker and the destacker. The destacker preferably includes a lift operable to move a stack of the automation compatible trays vertically in relation to the conveyor so that, as an uppermost tray in the stack is moved onto the conveyor, the stack can be moved vertically to position a next tray for unloading. The stacker preferably includes a lift operable to move a stack of the automation compatible trays vertically in relation to the conveyor so that, as an automation compatible tray is moved from the conveyor onto the lift, the lift can be moved vertically to allow another tray to be stacked on top of one or more trays already on the lift. An optional cap can also be provided between automation compatible trays on the first dolly and a bottom of the second dolly. The cap preferably includes a handle on one side and indentations on another side configured to receive the handle of an adjacent cap. The cap can also include a pair of grooves spaced to receive forklift tines and/or recessed corners to receive wheels of a second dolly. If a cap is provided, the second dolly preferably includes one or more pins on a bottom surface and the cap includes one or more openings in a top surface to receive the one or more pins. The cap can also be mounted on one or more poles for vertical movement. The dolly can be held in place within the dolly docking bay using a ball and detent or any other suitable locking mechanism. Furthermore, a second dolly can be hitched to the first dolly and transported through the dolly docking station one dolly at a time.

The above and/or other aspects, features and/or advantages of various embodiments will be further appreciated in view of the following description in conjunction with the accompanying figures. Various embodiments can include and/or exclude different aspects, features and/or advantages. In addition, various embodiments can combine one or more aspect or feature from other embodiments. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments.

DETAILED DESCRIPTION OF THE PREFERRED EMBODIMENTS

Various embodiments of the present invention can be employed in a variety of systems and devices. In one non-limiting example, embodiments of the present invention can be employed within an AFSM100™ flats sorting machine built by Northrop Grumman Corporation and Rapistan Systems and used by the United States Postal Service (USPS). The AFSM100™ flats sorting machine is a mail sorting system that can process, e.g., large pieces of flat mail, such as for example magazines, in large volumes. Each AFSM100™ flats sorting machine has three mail-feeding units and embodiments of the present invention can be utilized to improve one or more, preferably all, of these mail-feeding units. In some preferred embodiments, an AFSM100™ flats sorting machine is adapted to employ automatic flats stack correction by, e.g., splitting a mail delivery system into two separately controlled components such that, e.g., the machine can deliver mail more efficiently to a sorting unit. Preferably, this is accomplished substantially independently of an operator. The basic elements of the AFSM100™ flats sorting machine are described in U.S. published patent application number 2004/0245714, incorporated herein by reference.

Flat mail is mail which ranges in length from approximately 5 inches to approximately 15 inches, height from approximately 6 inches to approximately 12 inches, thickness from approximately 0.009 inches to approximately 0.75 inches, and weight from approximately 0.01 pound to approximately 1.0 pound. It may include paper envelopes, plastic wrappers, bound catalogs, banded newspapers, open mail pieces without wrappers, and the like.

In accordance with the present invention, a system is provided that allows mail-processing centers to physically and temporally separate the process of sorting mail and the process of moving mail into automation compatible trays (ACTs). The system of the present invention is a tray transfer system (TTS) which allows for a flexible method for shipping, moving, storing, loading, and unloading of ACTs between conveyor and dollies.

Figure 1:
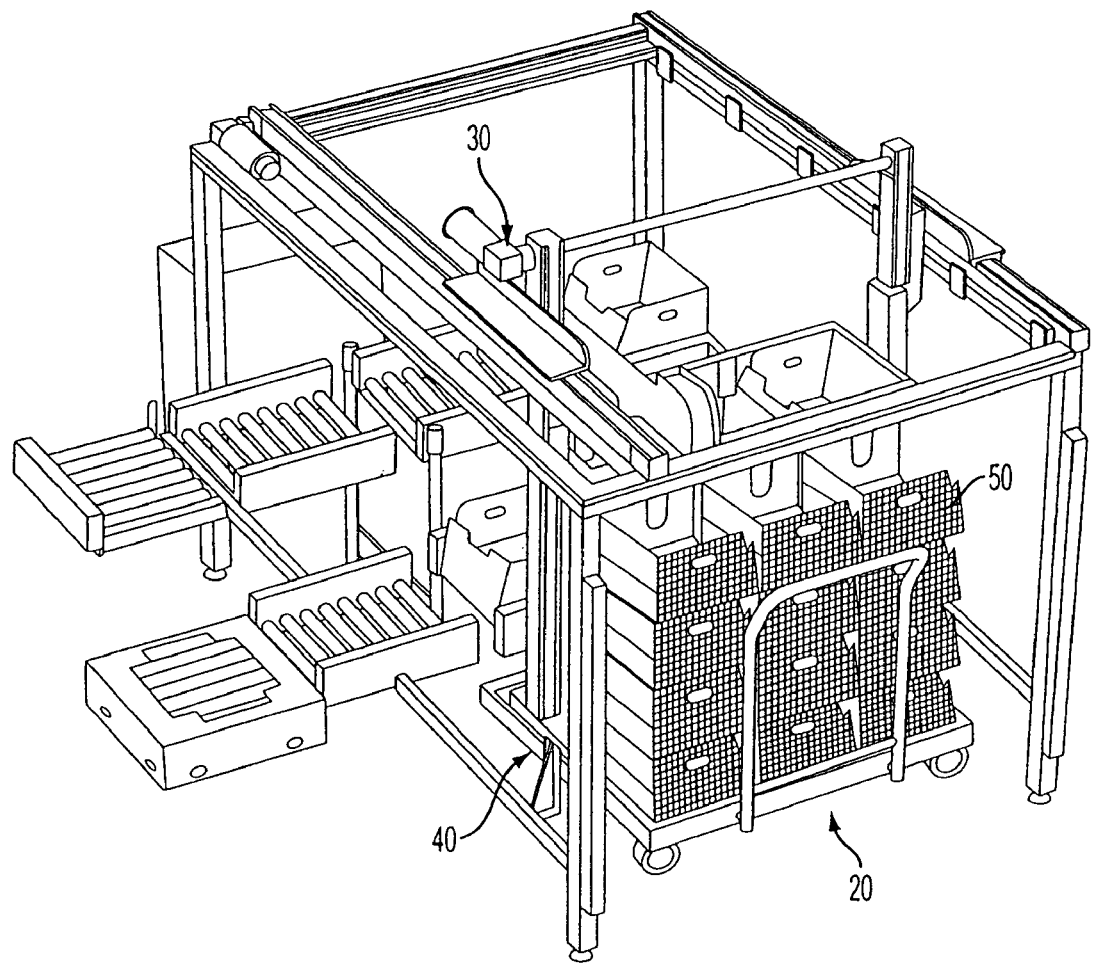
FIG. 1 is a top perspective view of the components of a gantry-based tray transfer system according to one embodiment of the invention.

FIG. 1 shows an illustrative gantry-based tray transfer system (TTS) that can be employed in some preferred embodiments of the invention. In a preferred embodiment, the gantry-based TTS 10 includes three components: a dolly 20, an overhead manipulator 30 and a dolly docking bay 40 as shown in FIG. 1. As shown in FIG. 1, the dolly 20 can be loaded with ACTs, one of which is indicated as 50. The dolly docking bay 40 locates the dolly 20 within the loading/unloading position as shown in FIG. 1.

Figure 2:
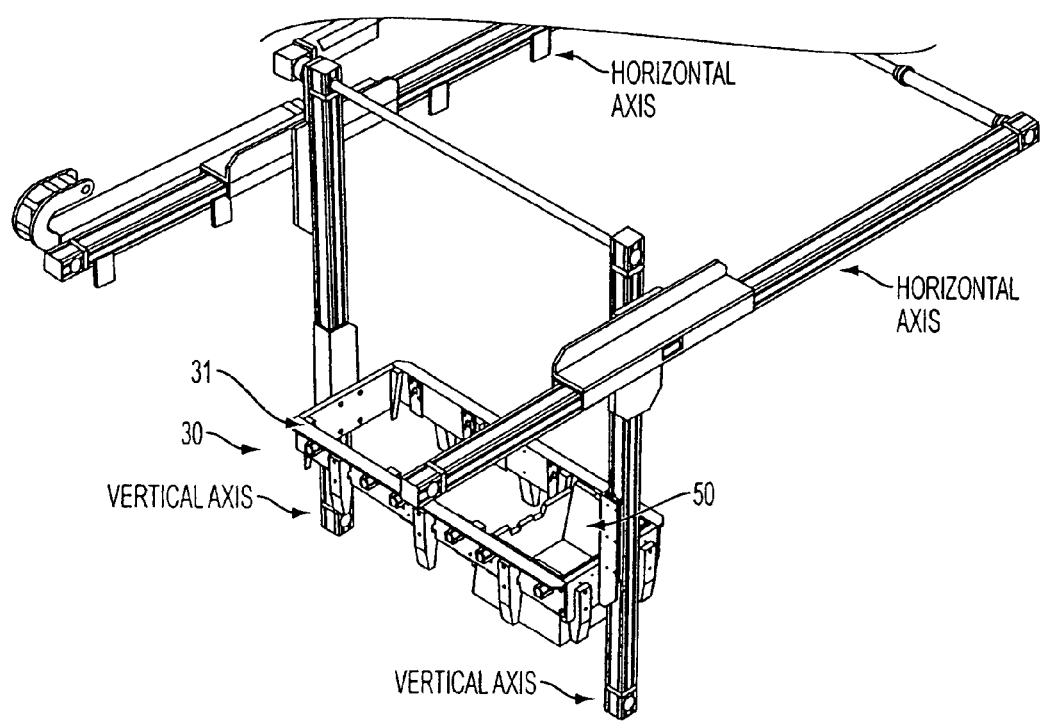
FIG. 2 is an enlarged view of an overhead manipulator showing a rectangular shaped end effector according to one embodiment of the invention.

In an illustrative embodiment of the gantry-based TTS, the overhead manipulator picks and places ACTs using an end effector which surrounds multiple ACTs. The overhead manipulator moves the ACTs between a dolly and conveyor (or vice versa) using a 2-axis gantry that enables vertical and horizontal actuation. The movement of the gantry is controlled by a program logical computer (not shown). The end effector of the overhead manipulator allows for picking and placing several ACTs at a time to provide the required throughput. In one embodiment, the overhead manipulator 30 includes a rectangular shaped end effector 31 as shown in FIG. 2. One ACT 50 is shown in the rectangular shaped end effector 31 in FIG. 2. In a preferred embodiment, the rectangular shaped end effector is slightly larger than three ACTs in order to pick and place several ACTs at the same time.

Figure 3:
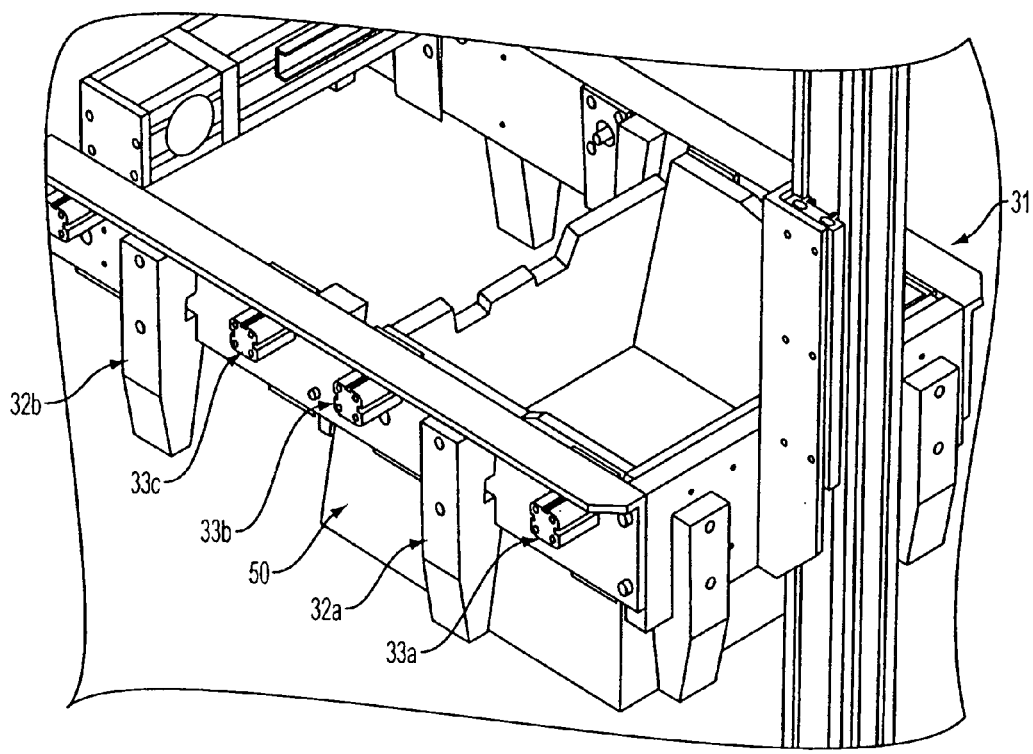
FIG. 3 is a close-up view of an overhead manipulator showing the guides and solenoid actuated probes on a rectangular shaped end effector according to one embodiment of the invention.

In one embodiment, the rectangular shaped end effector 31 includes guides 32a, 32b, 32c and solenoid actuated probes 33a, 33b, 33c as shown in FIG. 3. The guides are attached to each side of the rectangular shaped end effector 31 and two are used for each ACT 50 to ensure a proper alignment of the ACTs in the end effector. Each ACT 50 is held in place by the rectangular shaped end effector 31 using the solenoid actuated probes, e.g., two on each side of the rectangular shaped end effector, such as solenoid activated probes 33a, 33b as shown in FIG. 3. The solenoid activated probes extend to a registration hole in the side of the ACT 50.

Figure 4:
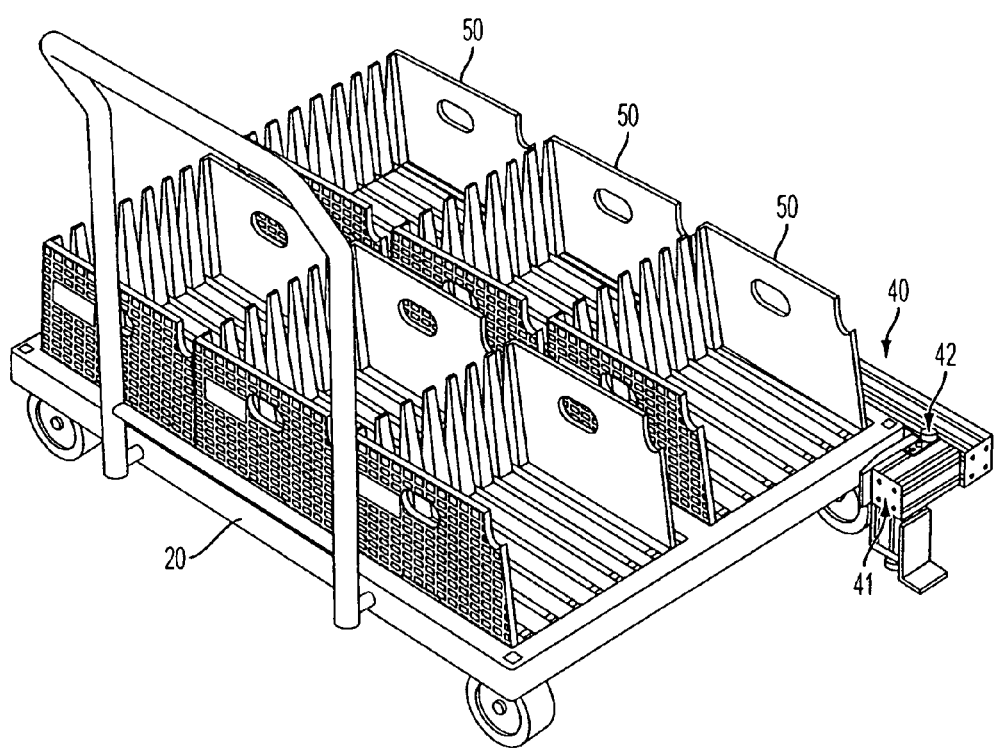
FIG. 4 is a top perspective view of the dolly containing ACTs with part of the dolly docking bay shown on the right side of the figure according to one embodiment of the invention.

One difficulty in picking up ACTs is determining the position and orientation (pose) of the dolly 20 relative to the overhead manipulator 30. This difficulty is resolved by using a dolly docking bay 40 as shown in FIG. 4. A guide 41 on each side of the bay, and a stop at the back help the operator push the dolly 20 into position. The dolly docking bay 40 allows the operator to quickly and repeatability push the dolly 20 into the same pose. A proximity sensor 42 in the back of the dolly docking bay 40 detects when the dolly 20 is properly positioned.

Figure 5:
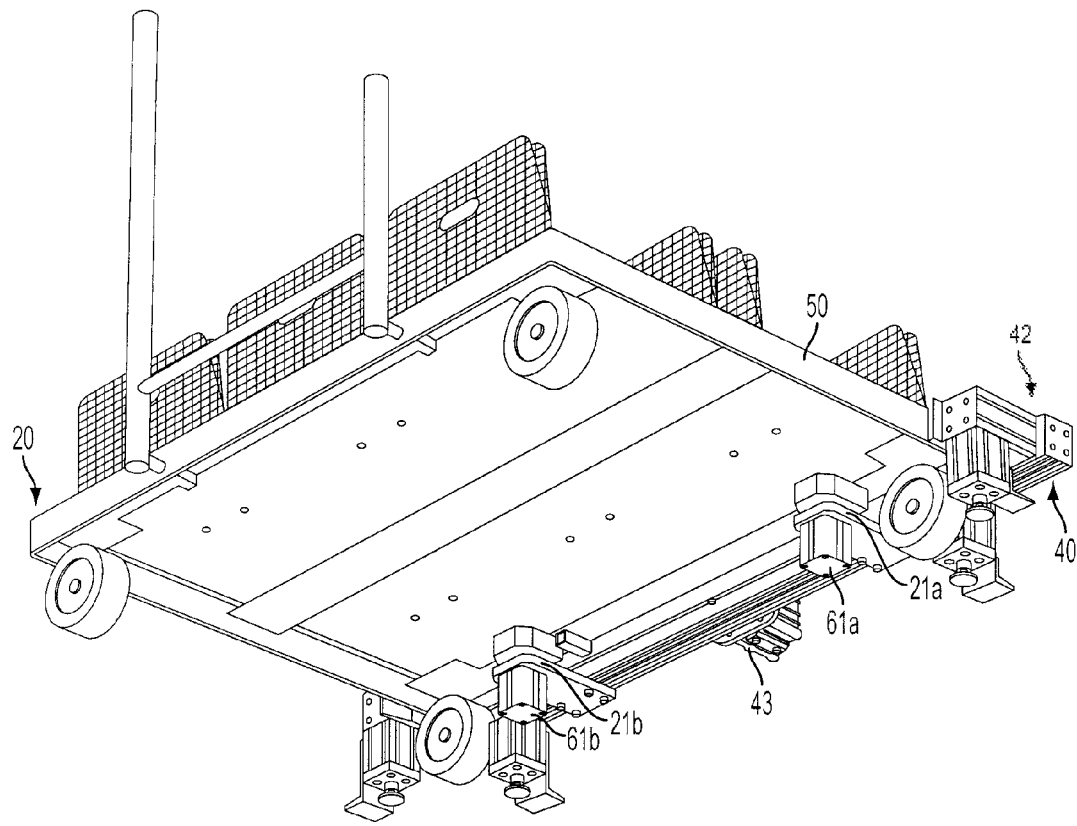
FIG. 5 is a bottom perspective view of a dolly in a dolly docking bay according to one embodiment of the invention. The dolly locking mechanisms are visible in the center of the figure according to one embodiment of the invention.

As shown in FIG. 5, when the proximity sensor 42 detects that the dolly 20 is in position, dolly locking mechanisms 61a, 61b on the floor (underneath the dolly) extend and contact two oversized holes 21a, 21b in the underside of the dolly 20. A pushing mechanism 43 on the back of the dolly docking bay extends and pushes on the front of the dolly 20. These dolly locking mechanisms 61a, 61b and the pushing mechanism 43 at the back of the dolly docking bay 40 properly position the dolly in the dolling docking bay. Additionally the locking mechanisms 61a, 61b prevent the dolly from moving during the loading and unloading process.

Figure 6:
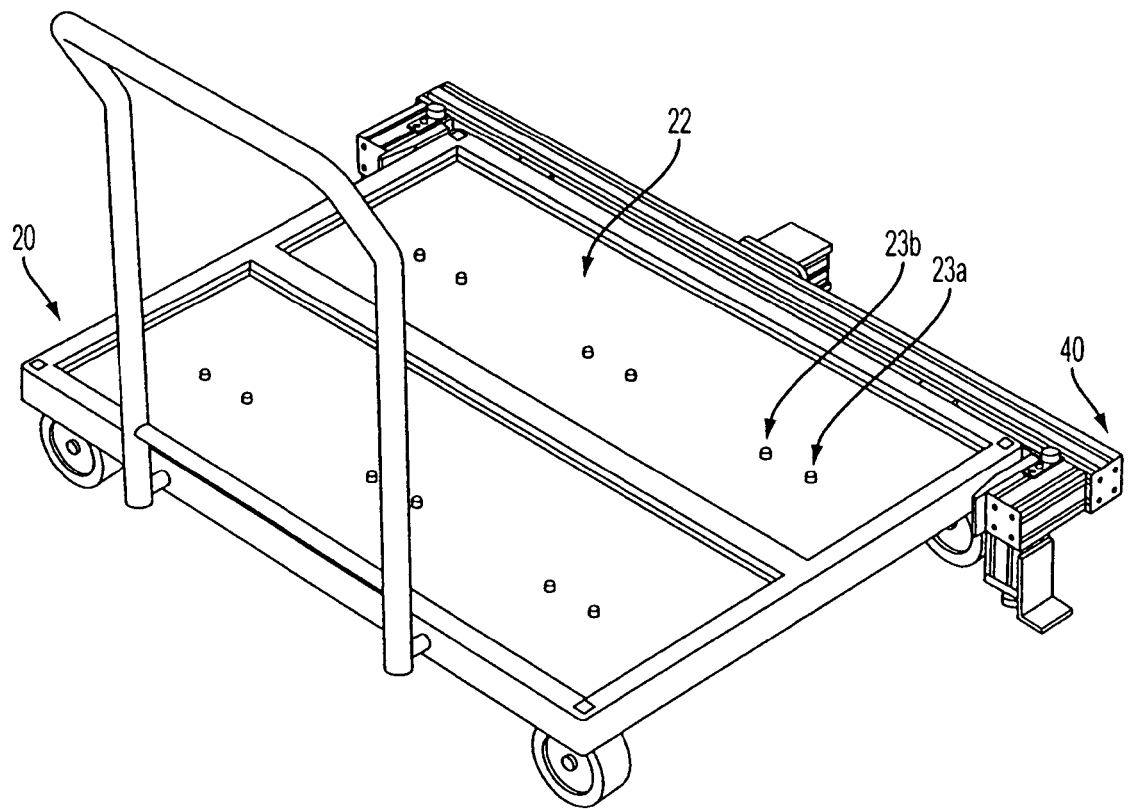
FIG. 6 is a top perspective view of an empty dolly showing the lowered floor and registration probes according to one embodiment of the invention.

Another difficulty is locating where ACTs are on a dolly. The ACTs could shift while moving on a traditional dolly, or be stacked in the wrong position for the overhead manipulator. As shown in FIG. 6, this problem can be solved by creating an impression of an ACT in the dolly carrying surface 22 for each ACT. Furthermore, for each ACT the dolly has two registration probes 23a, 23b which match two holes in the ACT. These registration probes help guide the ACT into place as well as hold it there during transport.

Figure 7:
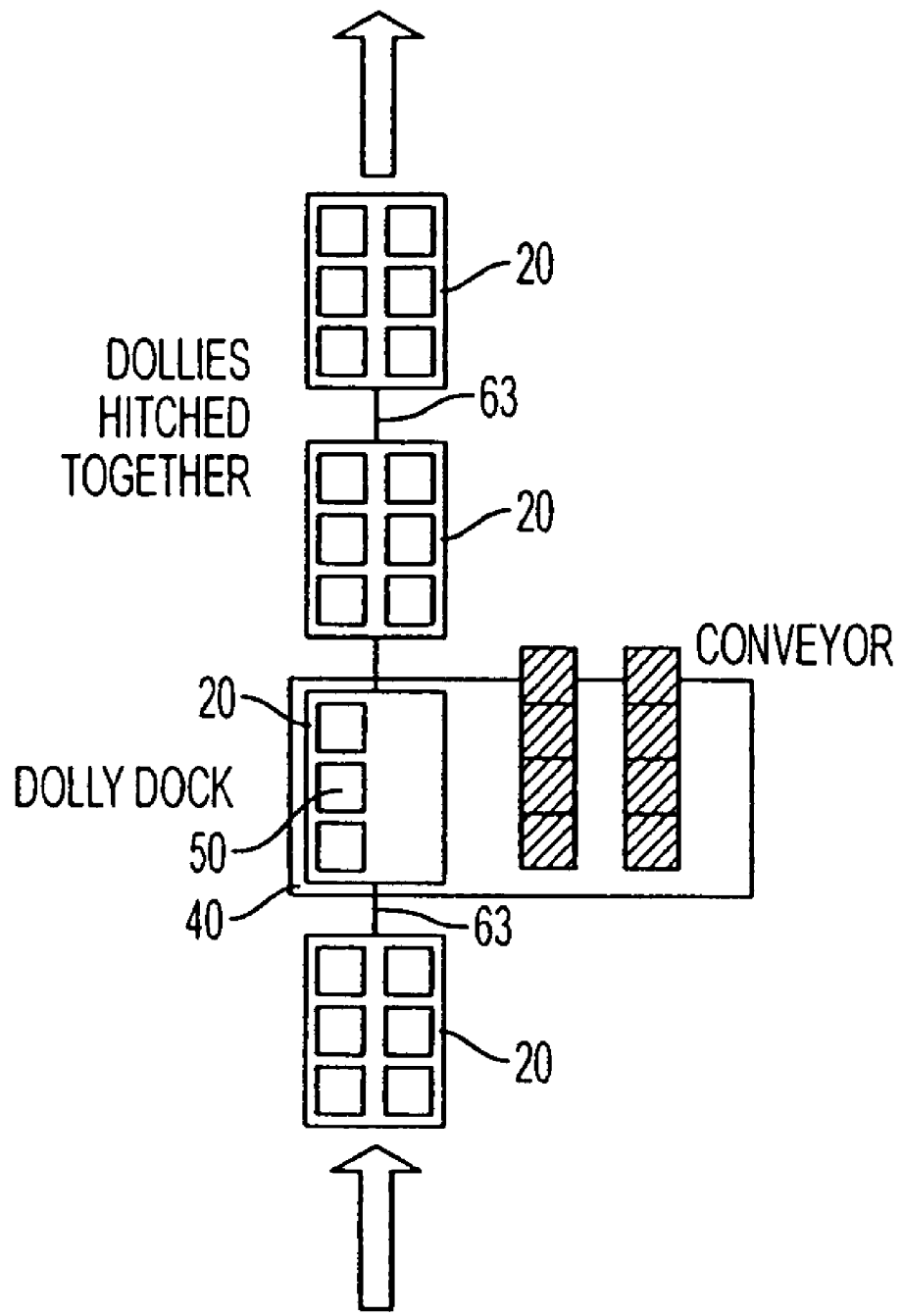
FIG. 7 is a schematic of dollies automatically processing through a dolly dock bay according to one embodiment of the invention.

In another embodiment, techniques for transporting dollies throughout the mail processing center are also provided by the invention. In one embodiment, shown in FIG. 7, multiple dollies 20 are hitched together at 63 to form a train. Once hitched together, the dollies can be pulled around using a mechanized vehicle. In one embodiment of a tray transfer system (also sometimes referred to as a dolly dock), dollies 20 that are hitched together can be moved into and out of a dock 40 automatically as shown in FIG. 7. Other embodiments of automatically moving dollies with ACTs include: a power and free chain with the dog on the bottom of the dolly or a fin on the bottom of the dolly that is pushed along using side mounted powered tires.

Dollies provide a flexible, space efficient, means of storing and transporting mail in machine compatible trays. The overhead manipulator and dolly docking bay allow for fast, automatic loading and unloading of ACTs from dollies. These components are combined to create the Tray Transfer System which allows for efficient physical and temporal separation of mail preprocessing from mail sorting.

It has been discovered in operation that the gantry-based TTS, although suitable for accomplishing its goal, has some limitations that may limit its use. The end effector has a difficult time properly picking and placing the ACTs on the dolly. This difficulty is due to a tolerance stack-up: between the ACTs and the dolly, the dolly to the dock, and the dock all to the end effector. Even with the lead-ins the solenoid grippers sometimes miss the holes during picking and place the ACTs incorrectly during stacking. This often wouldn't prevent the gantry from picking up the ACT; instead because it was picked up incorrectly it would cause the gantry to crash into either the dolly or conveyor when it was setting down a group of ACTs. This resulted in the gantry becoming misaligned. Re-aligning the large gantry system is a difficult task due to its weight (~150 lbs) and tolerances required.

The gantry-based TTS also has some wasted space for two reasons. First, the end-effector interacts with the sides of the ACT so the stacks of ACTs can't be very close together on a dolly. This creates empty space on a dolly and increases its size. The second source of wasted space is due to the handle. When the dollies are parked end-to-end (often the case in a postal environment) there is additional wasted space on the dolly due to the handle overhead between dollies. It would be better if dollies nested such that when parked next to each other the features which protrude (the handles) would mate with the adjacent dolly. Given the operational considerations of the post office and other facilities wasted space is undesirable.

In the gantry-based TTS, the dolly also lacks an effective ACT retention device. When stopped abruptly, either into the dock or any other fixed object, the ACTs have a tendency to fall off the dolly and onto the floor. Not only does this present a safety concern it creates work for the postal operators and potentially damages mail. Although a cap has been described above, it is not efficient in view of the design of the gantry-based dolly.

The gantry-based TTS includes a dolly which holds nominally 24 ACTs (2-wide by 3-long by 4-high). The footprint then is 2×3 ACTs. This footprint makes for a large dolly that is difficult to maneuver, especially when fully loaded. Although a smaller dolly could be used, the throughput of the dock decreases. Consider a 2-long by 2-wide by 4-high dolly. The horizontal and vertical moves remain the same and therefore take the same amount of time. However, only two ACTs can be transferred in that time as opposed to three with the 3×2×4 dolly. This cuts the throughput of the machine by 33%.

In view of these limitations of the gantry-based TTS in operation, a further embodiment of a Tray Transfer System is desired that can operate with loose tolerances, wastes a minimum of floorspace, retains the ACTs, and can maintain a high throughput in a 2×2 ACT footprint. Thus, in accordance with a second illustrative embodiment, the present invention provides a conveyor-based Tray Transfer System, which is illustrated with reference to FIGS. 8-14.

Figure 8:
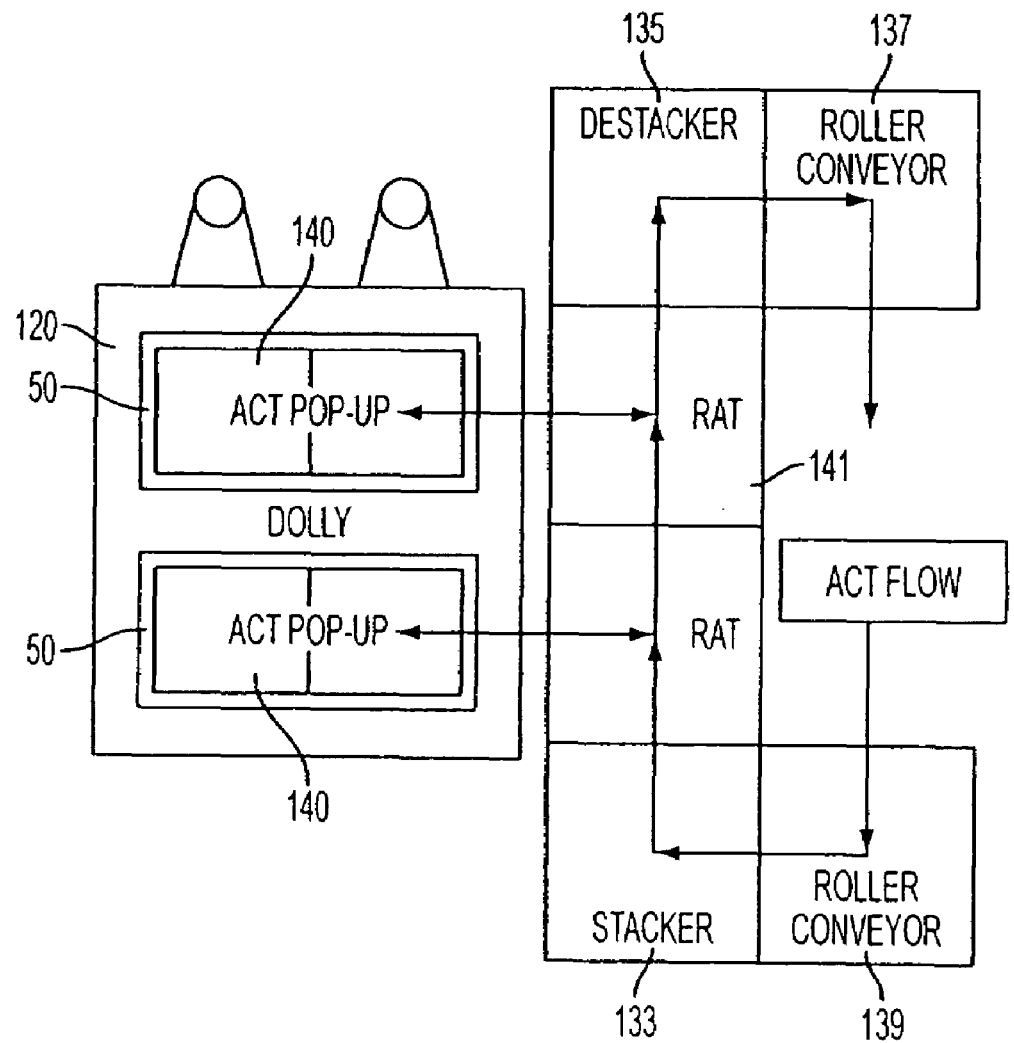
FIG. 8 shows an overall dolly system layout of a conveyor-based tray transfer system according to a second embodiment of the invention.
Figure 9:
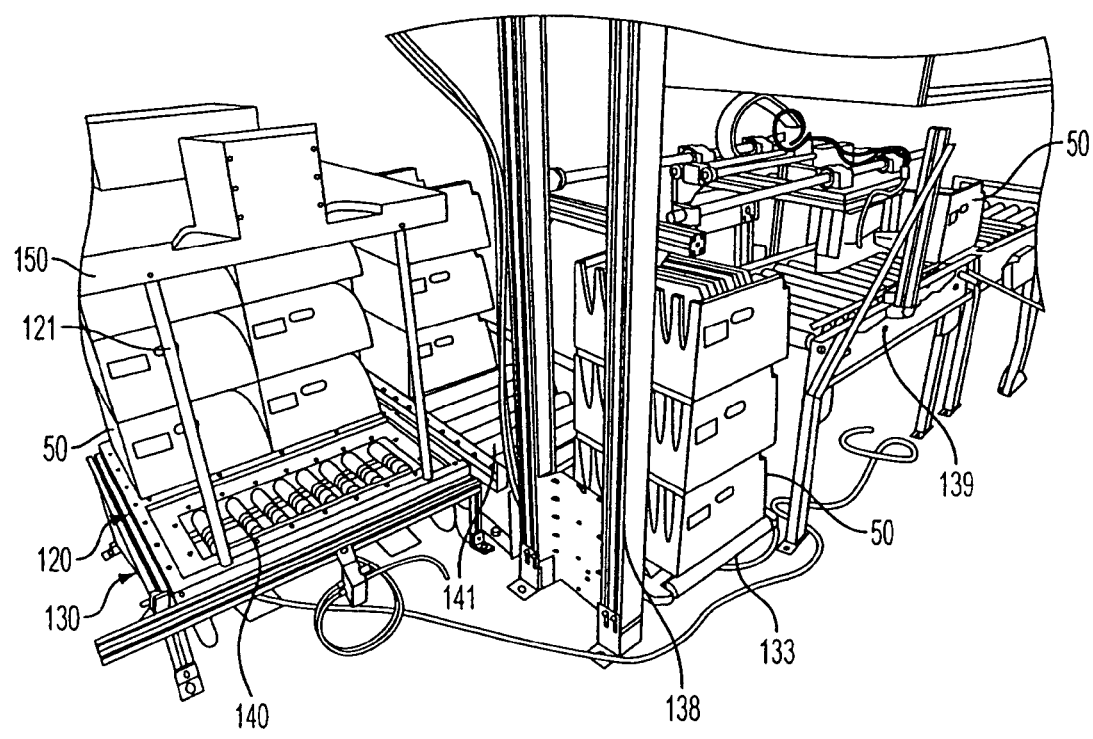
FIG. 9 shows a system layout for a conveyor-based tray transfer system according to one embodiment of the invention.

FIGS. 8 and 9 show an illustrative conveyor-based tray transfer system (TTS) that can be employed in some preferred embodiments of the invention. In a preferred embodiment, the conveyor-based TTS includes four main components: (a) dolly 120, (b) dock 130, (c) stacker 133 and (d) destacker 135. The dolly 120 enters the dock 130 and is registered on a set of conveyor rollers 140. These rollers 140 rise through openings in the bottom of the dolly 120 ("pop-up" shown in FIG. 9) and lift stacks of ACTs 50. In addition, if a cap is provided, pins are raised which lift the cap off the stacks. The stacks are then conveyed one at a time into the destacker 135. The destacker disassembles the stack one ACT at a time onto roller conveyor 137. Meanwhile the stacker 133 is creating stacks of ACTs from roller conveyor 139 which are conveyed onto the dolly 120 as soon as the original stacks are conveyed off. The stacks of ACTs are moved onto or off the dolly by a right angle transfer (RAT) 141. In a preferred embodiment, shown in FIG. 9, the dolly 120 and conveyor 139 are vertically spaced relative to one another, and lifts 138 are used to vertically align the stacks of ACTs 50 in the stacking and destacking process. For example, when building a stack of ACTs 50, the lift 138 can be moved vertically (e.g., in a downward direction) to present an empty slot for an ACT 50 moving toward the stacker 133 from the conveyor 139. Conversely, when disassembling a stack of ACTs 50, the lift can be moved vertically (e.g., in an upward direction) to position the uppermost of the ACTs 50 at the same level as the conveyor for transfer.

The conveyor-based dolly TTS is able to achieve high throughput because it accomplishes four tasks in parallel: (a) loading the dolly, (b) unloading the dolly, (c) stacking ACTs, and (d) unstacking ACTs. In the gantry-based TTS, the dolly is unloaded and the stacks are destacked one row at a time. There is only one end-effector so while it is occupied unstacking there is nothing else that can be clearing the dolly or putting ACTs back on the dolly. Whereas in the conveyor-based TTS, stacks of ACTs (e.g., three-high) can move on and off of the dolly at the same time. Meanwhile on one end of the machine the stacks coming off the dolly 120 are dismantled (labeled the destacker 135 in FIG. 8) and at the other end of the machine stacks coming onto the dolly 120 are built (labeled the stacker 133 in FIG. 8). Doing this all in parallel dramatically increases throughput compared to a gantry style machine.

Figure 10:
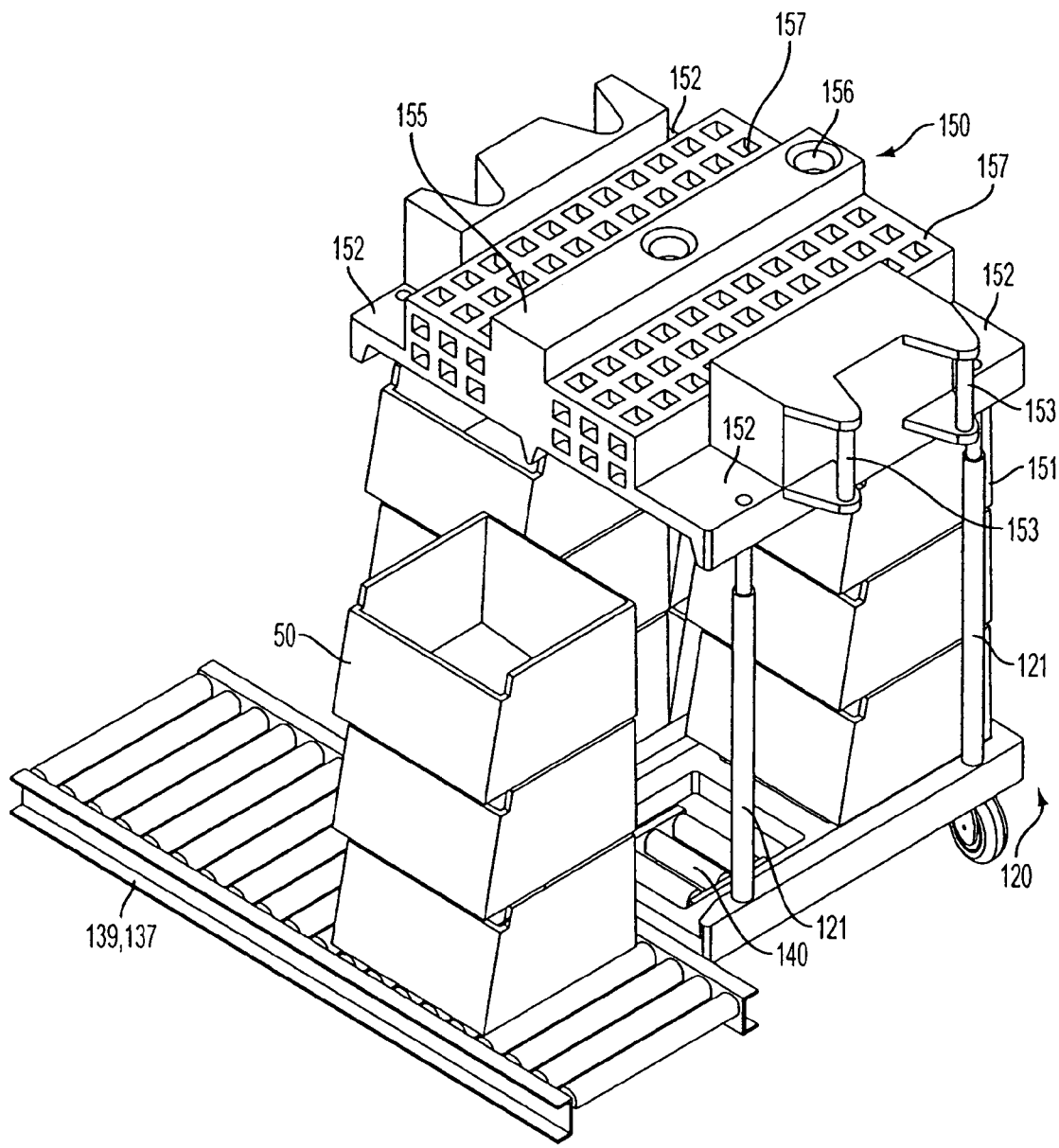
FIG. 10 shows an arrangement of a dolly and conveyor according to one embodiment of the invention.

In another embodiment shown in FIG. 10, additional storage methods for the dolly are provided by the invention. In one embodiment, dollies 120 can be stacked on top of each other using a dolly cap 150. The cap 150 is placed on top of a dolly full of ACTs 50. Another dolly is then lifted and placed on top of this cap, thus stacking dollies vertically. In this embodiment, the dollies can have locking wheels and indentations in the top of the cap. The locking wheels and indentations prevent a stack of dollies from falling over. The cap is also an effective way of preparing a stack of ACTs on a dolly for long distance transport. Straps can be used to connect the dolly to the cap to stabilize the ACTs during transport. ACTs 50 are retained on a dolly 120 during abrupt stops and crashes by the use of the retention cap 150. This cap 150 rests on the ACTs 50 and has features on the underside that locate the stacks of ACTs properly within the cap. Attached to the cap are four poles 151 that run to the base of the dolly 120. These poles run within 4 hollow tubes 121 located on the dolly 120 which act as guides for the poles and support the cap in the event that there are no ACT's within the dolly. The cap 150 can now be lifted from underneath the dolly by pushing on the poles 151. These features allow the cap to be lifted off the ACTs from below, before the dolly is unloaded and allows the cap to settle in the proper position after new stacks have been loaded onto the dolly.

Figure 11A:
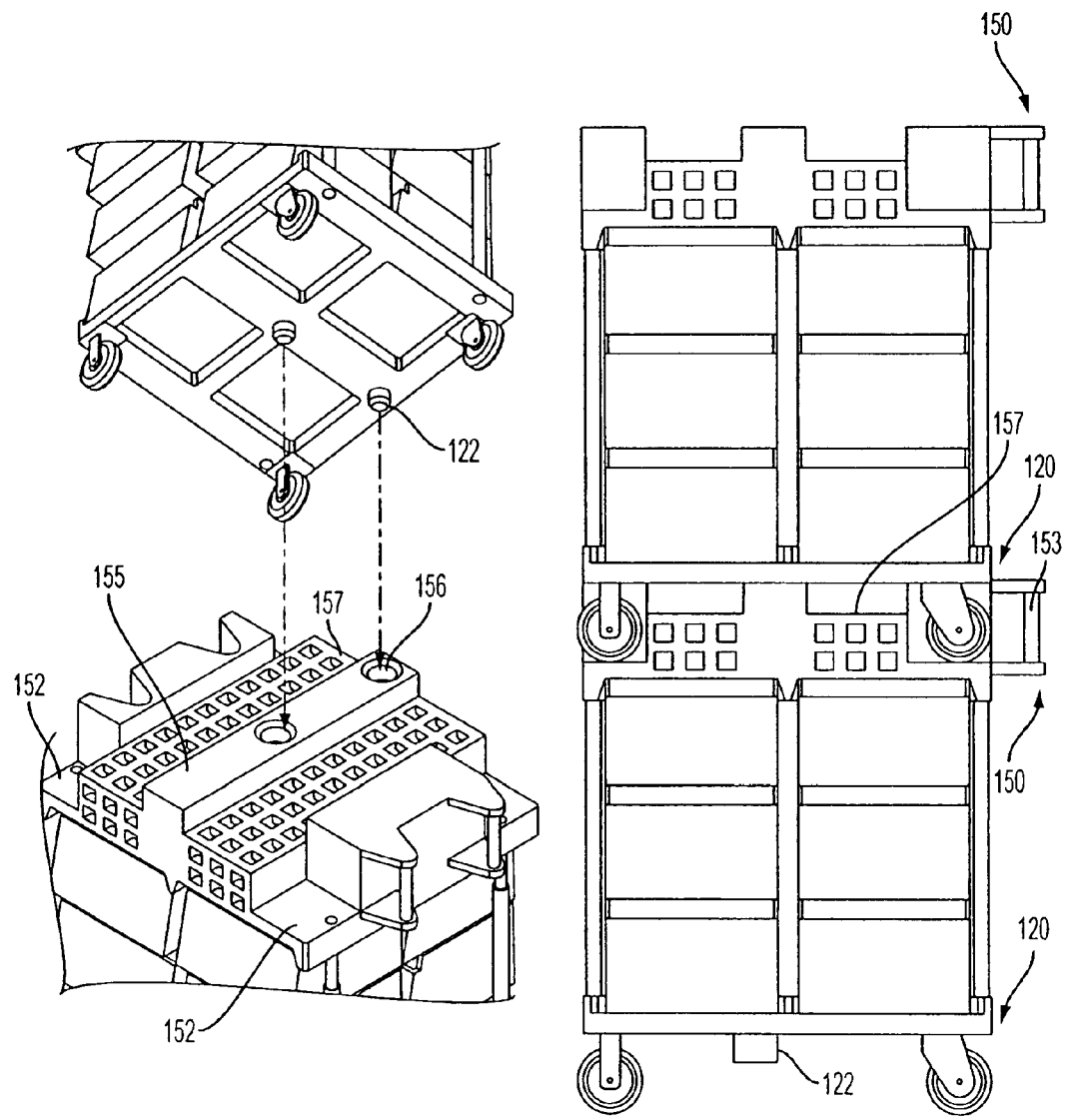
FIGS. 11A and 11B show features of a dolly cap according to one embodiment of the invention.
Figure 11B:
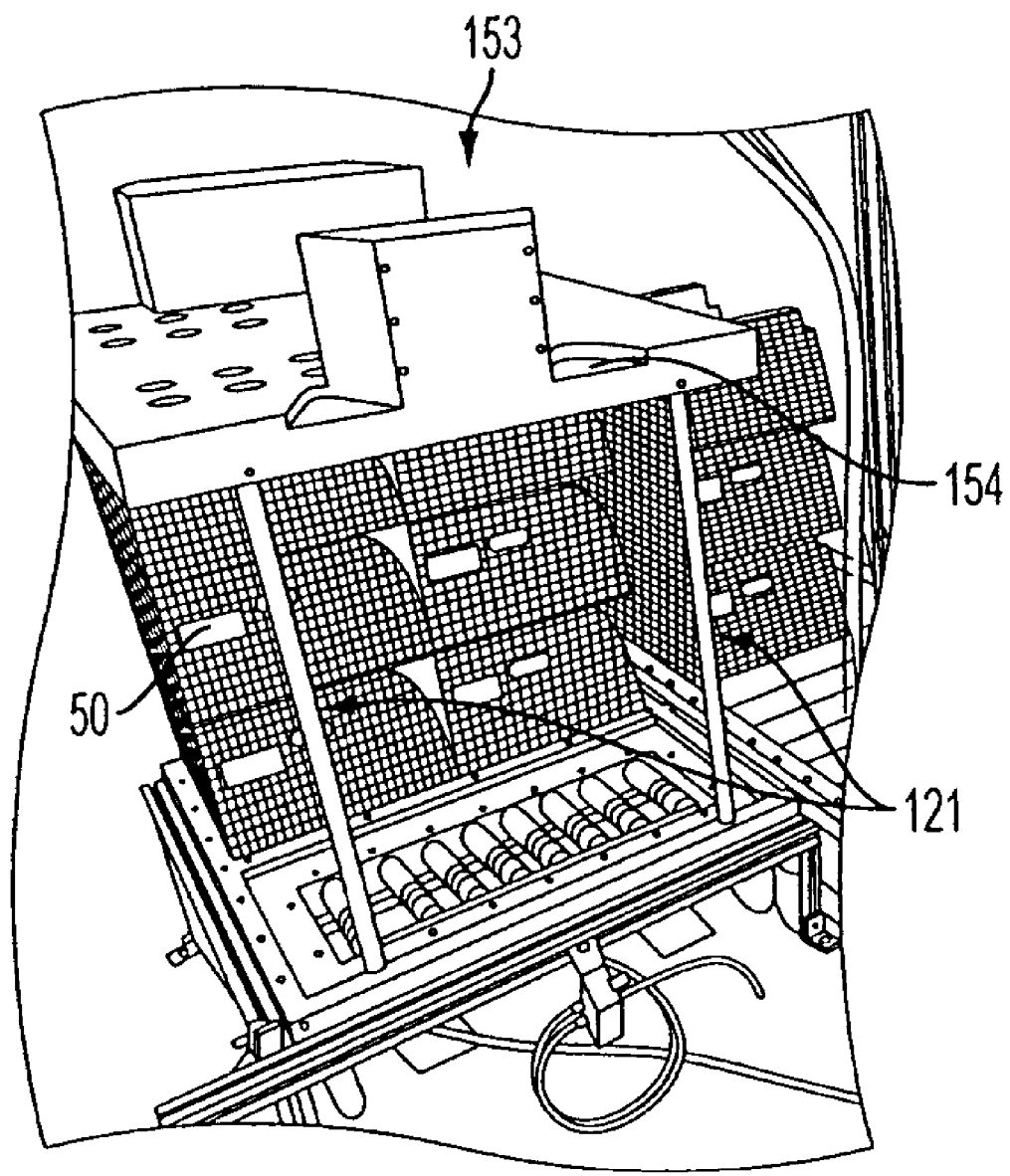
Figure 12:
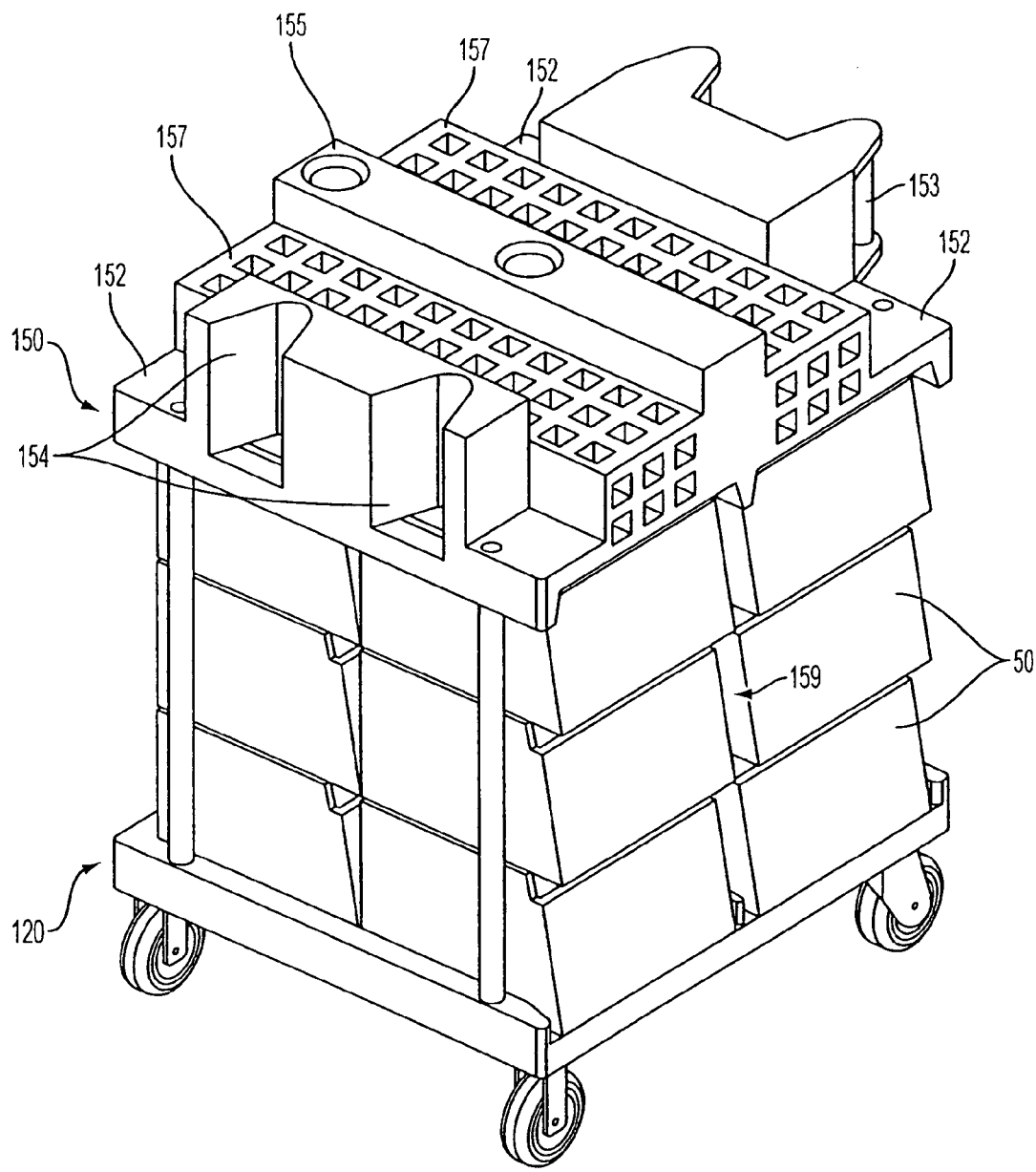
FIG. 12 illustrates a dolly containing ACTs and a dolly cap showing the gaps between the ACTs according to one embodiment of the invention.

In addition, as illustrated in FIGS. 11A, 11B and 12, the handles 153 and nesting features 154 are molded into the cap. To allow for vertical stacking of dollies corners of the cap are provided with four recessed portions 152 to receive the wheels of the upper dolly. The recessed portions 152 keep the wheels from the upper dolly from contacting the lower dolly and prevents the top dolly from rolling off. A pair of elongate grooves 157 are formed in an upper surface of the cap 150 in parallel arrangement to define clearance for forklift tines. An island 155 is disposed between the grooves 157 to support the bottom of the upper dolly in cooperation with the handle portions 153, 154. There are also holes 156 on the island which mate with pins 122 which are on the dolly bottoms. These pins ensure proper alignment of the stacked dollies and helps secure the top dolly.

FIG. 12 also illustrates the gap structure between the ACTs according to one embodiment of the invention. In an effort to minimize the floor space a dolly occupies, the gaps 159 between the stacks of ACTs 50 as well as the lips around the outsides of the ACTs are as small as possible. Due to the conveyor design there is no need to have large gaps between the ACTs to accommodate end effectors. Therefore the ACTs can be packed tighter on the dolly 120.

The conveyor-based TTS operates with fairly loose tolerances. The tightest tolerances are associated with stacking and destacking ACTs. In destacking the column of ACTs must be registered in the lift such that the destacking shuttle can grab the ACT properly. The vertical lift moves via a servo motor and the shuttle has lead-ins to help register the ACT.

Before the stacking shuttle picks the ACT from the conveyor the ACT is registered via positive stops and guide rails. When the shuttle builds the stack the ACTs are also registered via a mechanical stop and guide rails on the bottom ACT. The arrangement leads to very repeatable stack building.

Figure 13:
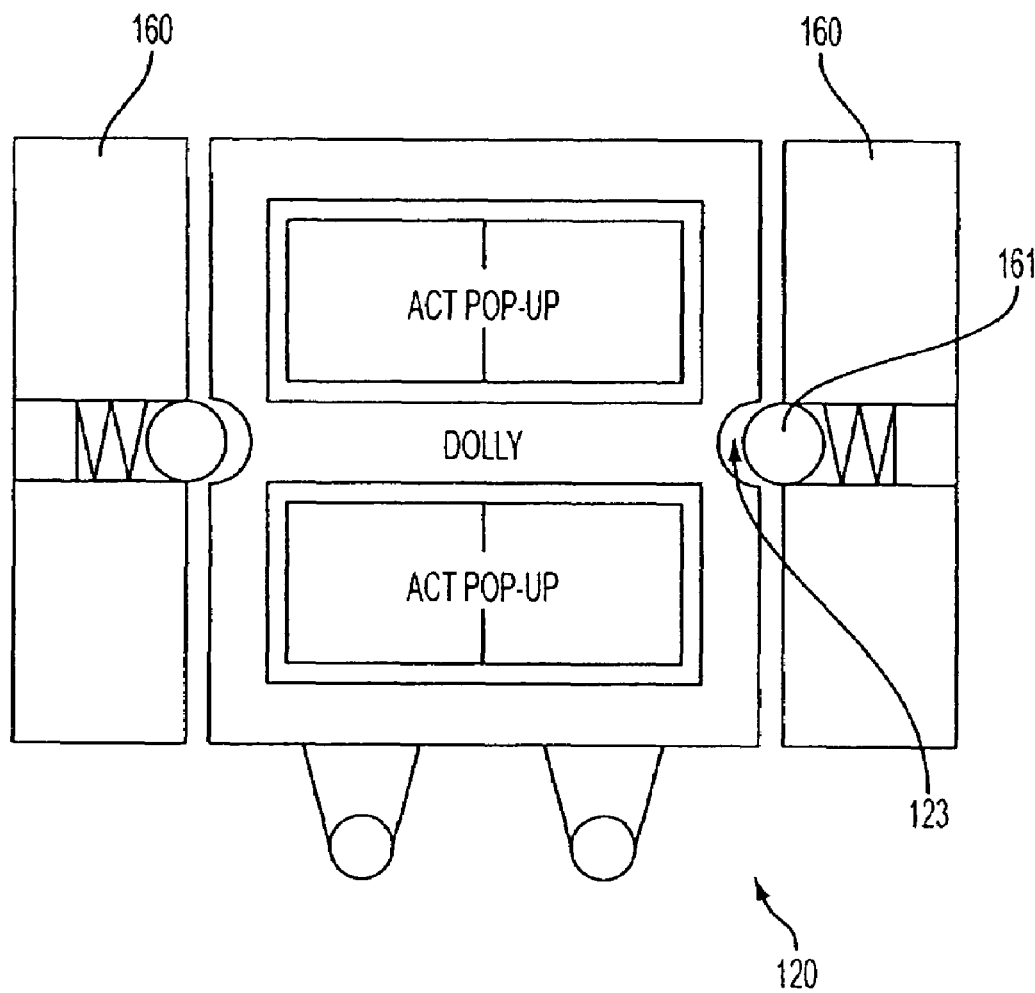
FIG. 13 illustrates a ball-dent combination for engaging a dolly according to one embodiment of the invention.

While the locking mechanisms and pushing mechanisms of the gantry-based TTS works well, the conveyor-based TTS can also employ a different system. As shown in FIG. 13, a ball 161 in the dolly guide 160 and a detent 123 in the dolly 120 combine to positively engage the dolly when it's correctly positioned within the dock can be used in accordance with one embodiment of the invention. Once the pop-up raises the cap the dolly will be engaged on the lift pins and the dolly will be locked into the dock.

Figure 14:
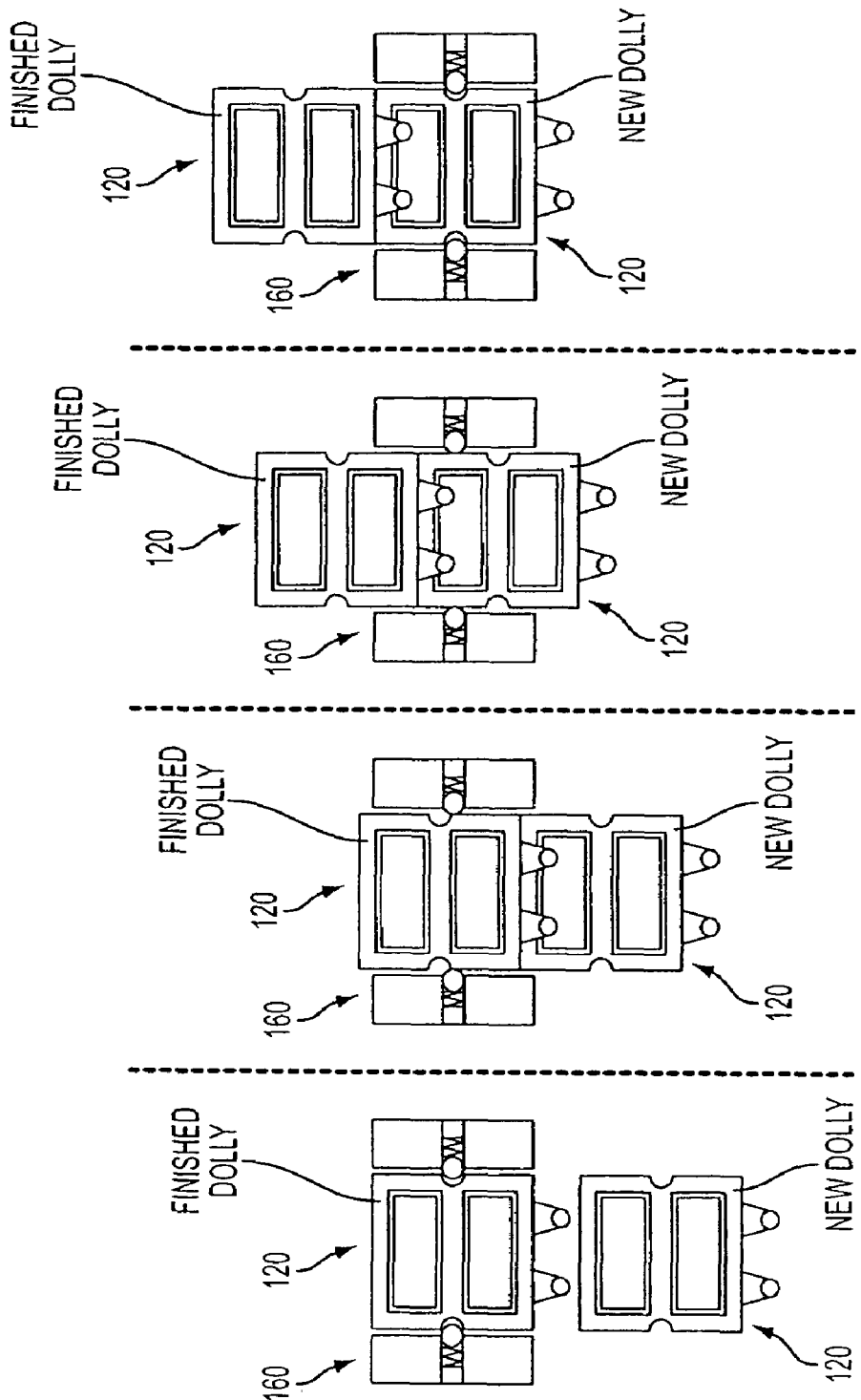
FIG. 14 illustrates the use of one dolly to push another dolly through the dock during a change out according to one embodiment of the invention.

This locking system enables the dock to become a "pass through" dock 160 as illustrated in FIG. 14 according to one embodiment of the invention. In the typical setting a dolly is pushed into a dock, the dolly is worked, and then pulled out the same way it was pushed in. The operator wastes time pulling out a dolly. In the pass through setting shown in FIG. 14 there is no wall in front of the dolly 120 as it's pushed into the dock 160. The dolly 120 is registered via the ball/detent 161/123 and worked as before. When the first dolly is ready to be removed the operator rolls the second dolly in behind the first and uses the second to push the first out as the second is pushed in. Here two goals are accomplished with one move: both the first dolly is pushed out and the second dolly is pushed in. While the second dolly is being worked the operator can park the first dolly where it belongs and can fetch a third dolly and have it ready to be pushed into the dock.

From the above, it will be appreciated that the present invention provides a system and method for transferring automation compatible trays containing mail between a dolly and a conveyor. According to one embodiment, a gantry-based Tray Transfer System (TTS) is provided. The gantry-based TTS provides a flexible method for shipping, moving, storing, loading, and unloading of ACTs between conveyors and dollies. The gantry-based TTS includes three primary components: (a) a specialized dolly designed to stack ACTs on it, (b) an overhead manipulator which picks and places several ACTs at once, and (c) a dolly docking bay which locates a dolly within the loading/unloading position. In one embodiment, the overhead manipulator includes: (a) a rectangular shaped end effector which surrounds multiple ACTs and (b) a 2-axis gantry under control of a program logical computer (PLC). In one embodiment, the rectangular shaped end effector includes: (a) guides attached to the side of the rectangular end effector which ensures a proper alignment of the ACTs in the end effector and (b) 4 solenoid actuated probes which extend to a registration hole in the side of the ACT to hold the each ACT in place. In operation of the gantry-based TTS, the overhead manipulator picks and places ACTs using a rectangular shaped end effector which surrounds multiple ACTs at the same time to provide the required throughput. The overhead manipulator moves the ACTs between a dolly and conveyor (or vice versa) using a 2-axis gantry that enables vertical and horizontal actuation. According to a second embodiment, a conveyor-based Tray Transfer System (TTS) is provided. The conveyor-based TTS provides a flexible method for shipping, moving, storing, loading, and unloading of ACTs between conveyors and dollies. The conveyor-based TTS includes three primary components: (a) a specialized dolly designed to stack ACTs on it, (b) a dolly dock, (c) a stacker and a destacker.

While some preferred embodiments involve the handling of flats having characteristics as detailed above, numerous other embodiments can be employed having various other flat configurations or specifications, such as, e.g., that disclosed in U.S. Pat. No. 6,443,311. The foregoing illustrative embodiments do not limit the broad applicability of the invention to various thin objects having other characteristics, which may vary widely depending on the particular circumstances.

While illustrative embodiments of the invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure or step are not recited.

While the processes described herein have been illustrated as a series or sequence of steps, the steps need not necessarily be performed in the order described, unless indicated otherwise.

What is claimed is:

1. A system for automatically transferring one or more trays of mail between a dolly and a conveyor comprising:
   one or more automation compatible trays configured to hold mail:
   a conveyor configured to transport said one or more automation compatible trays;
   a dolly having an upper surface upon which said one or more automation compatible trays can be loaded and unloaded:
   a dolly docking bay configured to receive said dolly in a loading/unloading position relative to said conveyor; and
   an overhead manipulator positioned relative to said dolly docking bay and said conveyor, said overhead manipulator having an end effector configured to engage one or more of said automation compatible trays and being movable to transfer said one or more trays of mail between said dolly in said loading/unloading position and said conveyor;
   wherein said automation compatible trays include a bottom surface with one or more holes formed therein and wherein said upper surface of said dolly includes one or more registration probes positioned to extend into said one or more holes in said bottom surface of said one or more automation compatible trays.

2. A system for automatically transferring one or more trays of mail between a dolly and a conveyor comprising:
   one or more automation compatible trays configured to hold mail;
   a conveyor configured to transport said one or more automation compatible trays;
   a dolly having an upper surface upon which said one or more automation compatible trays can be loaded and unloaded;
   a dolly docking bay configured to receive said dolly in a loading/unloading position relative to said conveyor; and
   an overhead manipulator positioned relative to said dolly docking bay and said conveyor, said overhead manipulator having an end effector configured to engage one or more of said automation compatible trays and being movable to transfer said one or more trays of mail between said dolly in said loading/unloading position and said conveyor;
   wherein said automation compatible trays include one or more side surfaces with one or more holes formed therein and wherein said end effector of said overhead manipulator is configured to extend at least partially around one or more of said automation compatible trays and to include one or more probes that can be extended into said one or more holes in said side surfaces of said one or more automation compatible trays.

3. The system of claim 2 wherein said end effector includes a rectangular shaped end effector having one or more guides for ensuring proper alignment of said one or more automation compatible trays in said end effector.

4. A system for automatically transferring one or more trays of mail between a dolly and a conveyor comprising:
   one or more automation compatible trays configured to hold mail;
   a conveyor configured to transport said one or more automation compatible trays;

a dolly having an upper surface upon which said one or more automation compatible trays can be loaded and unloaded;
a dolly docking bay configured to receive said dolly in a loading/unloading position relative to said conveyor; and
an overhead manipulator positioned relative to said dolly docking bay and said conveyor, said overhead manipulator having an end effector configured to engage one or more of said automation compatible trays and being movable to transfer said one or more trays of mail between said dolly in said loading/unloading position and said conveyor;
wherein said dolly docking bay includes a back member that acts as a stop and one or more side members that guide said dolly into said loading/unloading position within said dolly docking bay;
wherein said dolly docking bay includes one or more proximity sensors mounted on at least one of said stop and said sides to detect when said dolly is in said loading/unloading position within said dolly docking bay;
wherein said dolly docking bay further includes a locking mechanism that inhibits movement of said dolly when said proximity sensor detects that said dolly is in said loading/unloading position within said dolly docking bay; and
wherein said dolly includes a lower surface having one or more holes formed therein and wherein said locking mechanism includes one or more locking probes configured to extend into said one or more holes in said lower surface of said dolly.

5. A system for automatically transferring one or more trays of mail between a dolly and a conveyor comprising:
one or more automation compatible trays configured to hold mail;
a conveyor configured to transport said one or more automation compatible trays;
a dolly having an upper surface upon which said one or more automation compatible trays can be loaded and unloaded;
a dolly docking bay configured to receive said dolly in a loading/unloading position relative to said conveyor; and
an overhead manipulator positioned relative to said dolly docking bay and said conveyor, said overhead manipulator having an end effector configured to engage one or more of said automation compatible trays and being movable to transfer said one or more trays of mail between said dolly in said loading/unloading position and said conveyor;
wherein said dolly docking bay includes a back member that acts as a stop and one or more side members that guide said dolly into said loading/unloading position within said dolly docking bay;
wherein said dolly docking bay includes one or more proximity sensors mounted on at least one of said stop and said sides to detect when said dolly is in said loading/unloading position within said dolly docking bay;
wherein said dolly docking bay further includes a locking mechanism that inhibits movement of said dolly when said proximity sensor detects that said dolly is in said loading/unloading position within said dolly docking bay; and
wherein said locking mechanism includes a pusher that engages said dolly in said loading/unloading position.

6. A system for automatically transferring one or more trays of mail between a dolly and a conveyor comprising:
one or more automation compatible trays configured to hold mail;
a conveyor configured to transport said one or more automation compatible trays;
a dolly having an upper surface upon which said one or more automation compatible trays can be loaded and unloaded;
a dolly docking bay configured to receive said dolly in a loading/unloading position relative to said conveyor; and
an overhead manipulator positioned relative to said dolly docking bay and said conveyor, said overhead manipulator having an end effector configured to engage one or more of said automation compatible trays and being movable to transfer said one or more trays of mail between said dolly in said loading/unloading position and said conveyor;
wherein said dolly is a first dolly, and further comprising a cap configured for placement between automation compatible trays on said first dolly and a bottom of a second dolly.

7. A system for automatically transferring one or more trays of mail between a dolly and a conveyor comprising:
one or more automation compatible trays configured to hold mail;
a conveyor configured to transport said one or more automation compatible trays;
a dolly having a surface upon which said one or more automation compatible trays can be loaded and unloaded;
a dolly docking bay configured to receive said dolly in a loading/unloading position relative to said conveyor; and
at least one of a stacker for stacking automation compatible trays for loading onto said dolly from said conveyor and a destacker for unstacking automation compatible trays onto said conveyor after unloading from said dolly;
wherein one or more openings are formed through said surface of said dolly and wherein said dolly docking bay further includes one or more conveyors extendible through said openings to unload one or more automation compatible trays from said dolly.

8. A system for automatically transferring one or more trays of mail between a dolly and a conveyor comprising:
one or more automation compatible trays configured to hold mail;
a conveyor configured to transport said one or more automation compatible trays;
a dolly having a surface upon which said one or more automation compatible trays can be loaded and unloaded;
a dolly docking bay configured to receive said dolly in a loading/unloading position relative to said conveyor; and
at least one of a stacker for stacking automation compatible trays for loading onto said dolly from said conveyor and a destacker for unstacking automation compatible trays onto said conveyor after unloading from said dolly;
wherein said dolly is a first dolly, and further comprising a second dolly and a cap configured for placement between automation compatible trays on said first dolly and a bottom of said second dolly.

9. The system of claim 8, wherein said cap includes a handle on one side and indentations on another side configured to receive the handle of an adjacent cap.

10. The system of claim 8, wherein said cap includes a pair of grooves spaced to receive forklift tines.

11. The system of claim 8, wherein corners of said cap are configured to receive wheels of said second dolly.

12. The system of claim 8, wherein said second dolly further includes one or more pins on a bottom surface and wherein said cap includes one or more openings in a top surface to receive said one or more pins.

13. The system of claim 8, wherein said cap is mounted on one or more poles for vertical movement.

14. A system for automatically transferring one or more trays of mail between a dolly and a conveyor comprising:
- one or more automation compatible trays configured to hold mail;
- a conveyor configured to transport said one or more automation compatible trays;
- a dolly having a surface upon which said one or more automation compatible trays can be loaded and unloaded;
- a dolly docking bay configured to receive said dolly in a loading/unloading position relative to said conveyor; and
- at least one of a stacker for stacking automation compatible trays for loading onto said dolly from said conveyor and a destacker for unstacking automation compatible trays onto said conveyor after unloading from said dolly; further comprising a ball and detent mechanism holding said dolly in said dolly docking bay in said loading/unloading position.

15. A system for automatically transferring one or more trays of mail between a dolly and a conveyor comprising:
- one or more automation compatible trays configured to hold mail;
- a conveyor configured to transport said one or more automation compatible trays;
- a dolly having a surface upon which said one or more automation compatible trays can be loaded and unloaded;
- a dolly docking bay configured to receive said dolly in a loading/unloading position relative to said conveyor; and
- at least one of a stacker for stacking automation compatible trays for loading onto said dolly from said conveyor and a destacker for unstacking automation compatible trays onto said conveyor after unloading from said dolly;
- wherein said dolly is a first dolly, and further comprising a second dolly hitched to said first dolly.

* * * * *